Nov. 17, 1936.  U. O. HUTTON  2,061,424
HUMIDITY APPARATUS
Filed Dec. 1, 1931  5 Sheets—Sheet 1

INVENTOR
ULRIC O. HUTTON
BY
ATTORNEY

Nov. 17, 1936.   U. O. HUTTON   2,061,424
HUMIDITY APPARATUS
Filed Dec. 1, 1931   5 Sheets-Sheet 2

INVENTOR
ULRIC O. HUTTON.
BY
ATTORNEY

Nov. 17, 1936.        U. O. HUTTON        2,061,424
HUMIDITY APPARATUS
Filed Dec. 1, 1931        5 Sheets-Sheet 4

INVENTOR
ULRIC O. HUTTON
BY David Rines
ATTORNEY

Nov. 17, 1936.                  U. O. HUTTON                    2,061,424
                              HUMIDITY APPARATUS
                             Filed Dec. 1, 1931              5 Sheets-Sheet 5

INVENTOR
ULRIC O. HUTTON
BY David Rines
ATTORNEY

Patented Nov. 17, 1936

2,061,424

UNITED STATES PATENT OFFICE 2,061,424

HUMIDITY APPARATUS

Ulric O. Hutton, Newcastle, N. Y., assignor to The Cambridge Instrument Company, Inc., Ossining, N. Y., a corporation of New York Application December 1, 1931, Serial No. 578,329

29 Claims. (Cl. 73—24)

The present invention relates to apparatus for recording and controlling relative humidity, or the hydroscopic moisture content, of various materials.

An object of the invention is to provide a new and improved humidity controller, recorder or the like, particularly for measuring or regulating gas-humidity variations, operating upon a novel principle, that shall be efficient in operation, cheap to manufacture, and reliable.

Another object is to provide a new and improved pressure, or vacuum, measure or control of humidity, dependent upon pressure variations. A further object is to provide a new and improved temperature measure or control of humidity, dependent upon temperature variations.

Other and further objects will be explained hereinafter.

The invention will now be described more fully in connection with the accompanying drawings, in which.

Figure 6:
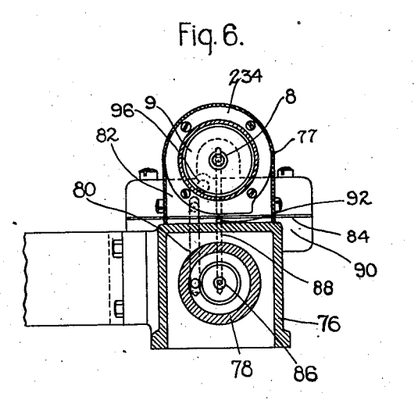
Fig. 6 is a section taken upon the line 6—6 of Fig. 5, looking in the direction of the arrows.
Figure 7:
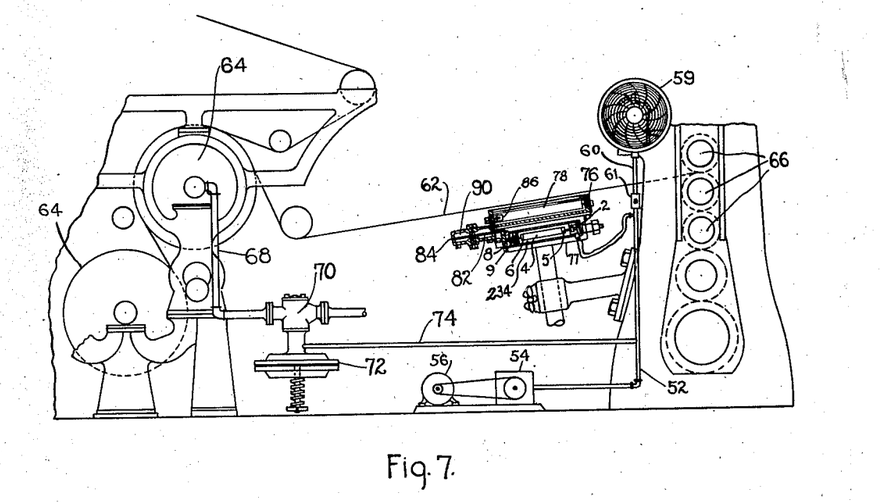
Fig. 7 is a diagrammatic view, illustrating the invention applied to the drying of a moisture-laden, paper web, during paper manufacture.
Figures 8, 9, 10:
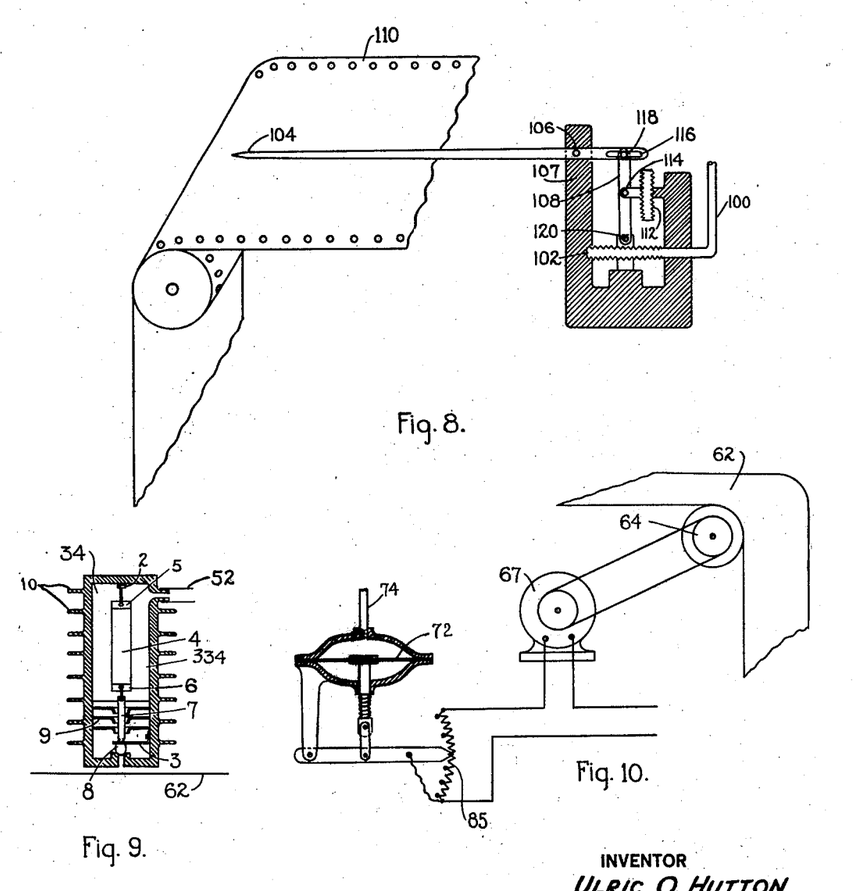
Fig. 8 is a diagrammatic view illustrating a barometric-correction device for a humidity recorder.
Fig. 9 is a modification of part of the diagrammatic showing of Fig. 1.
Fig. 10 is a view illustrating the application of the invention to the speed control of paper machines.

A moisture-sensitive strip 4, constituted of any suitable hygrometric material, is mounted between rigid end pieces 5 and 6 in a closed, protecting enclosure or box or chamber 34 (Figs. 1, 3 and 4), 134 (Fig. 2), 234 (Figs. 5, 6 and 7), or 334 (Fig. 9). The end piece 5 is secured at one end of the box 34, 134, 234 or 334 to a member 2 which, as shown in Fig. 5, may be threadedly or otherwise adjustable. The end piece 6 is connected by a link 7 to a regulating member at the other end of the box 34, 134, 234 or 334. The regulating member may be of any desired construction, shown as a valve 8 in Figs. 1, 3 to 7 and 9, and as a pivoted lever 11, in Fig. 2, for controlling a rheostat 13. The rheostat 13 may control a heating unit 15 in series therewith. The moisture-sensitive strip 4 will have a tendency to expand and contract in response to the moisture content or humidity changes in the air, gas or other medium that may thus enter the box 34, 134, 234 or 334. When the moisture content of the air or other gas entering the box 34, 134, 234 or 334 through the valve 8, or past the heating unit 15, tends to become increased, the strip 4 tends to become lengthened. In Figs. 1, 3 to 7 and 9, a light, adjustable spring 3, acting through the medium of the link 7, thereupon tends partly to close the valve 8. In Fig. 2, a spring 103 acts correspondingly to pull the lever 11 in one direction to effect an adjustment of the rheostat 13. When the moisture content in the box 34, 134, 234 or 334 tends to become decreased, the strip 4 will tend to become shortened. The valve 8 will thereupon tend to become opened more to admit more moisture-laden air or other gas into the box 34, 234 or 334; or the lever 11 will tend to effect a corresponding adjustment of the rheostat 13 in the opposite direction. The degree of opening of the valve 8 thus changes minutely with changes in humidity conditions. In practice, the valve 8 will be set so as always, under normal conditions, to be open to some extent, thereby permitting slight leakage. The link 7 is so related to the suitably tensioned spring 3 or 103 as to be free to move back and forth, without friction.

The air or gas in the box tends continuously to become exhausted: in Figs. 1, 3 to 7 and 9, through a pipe 52 of any desired, continuously operating, exhausting mechanism 54, such as a vacuum pump, or an aspirator, that may be driven by a motor 56; and in Fig. 2, by means of a fan 53 driven by a motor 55, and which effects circulation of the air of the system. The pipe 52 exhausts through the pump 54 into the atmosphere. The fan 53 produces a similar exhaust into the atmosphere. As soon as there is a tendency for the valve 8 to become closed, the pumping action of the pump 54 tends to cause the air or other medium in the box 34, 234 or 334 to become rarefied.

It is a well known principle of physics that, at a fixed temperature, the relative humidity of a partly saturated gas varies inversely as the volume and directly as the pressure. This principle holds up to the saturation pressure for the stated temperature. When, therefore, the pressure of a body of partly saturated air is reduced, the relative humidity of the body of air, provided its temperature is unchanged, decreases directly in proportion to the decrease in the absolute pressure. If the volume of a gas, partly saturated with water vapor, is doubled, for example, its relative humidity is halved. Again, if the pressure of a body of air, originally at barometric pressure of 15 pounds, and having a relative humidity of 80%, is reduced to 7½ pounds, without altering the temperature of the air, its relative humidity theoretically becomes 40%.

It follows from this principle that the tendency to rarefaction of the air in the box or chamber 34, 234 or 334 produced by the exhausting device 54 tends to lower the humidity of the air therein. The valve 8 accordingly tends to become opened to more than the normal degree of opening. Test air, then entering the chamber 34, 234 or 334 through the open valve 8, tends to cause the chamber pressure to increase, thus increasing the relative humidity of the air therein, with the result that the spring 3 tends again to close the valve 8. The quantity of air drawn into the box 34, 234 or 334 through the valve 8 is thus regulated. In this manner, the valve 8 tends successively to become opened and closed, more or less, with the result that the air of the chamber 34, 234 or 334 can not become rarefied more than to a certain degree, this degree of rarefaction corresponding to a humidity that will just cause the valve 8 to leave its seat. This is the normal, operating position of the valve 8. The strip 4 will, therefore, tend to maintain a uniform, substantially constant, moisture content and length, as it will be directly affected by the relative humidity in the closed chamber 34, 234 or 334. It will merely oscillate back and forth in moisture content as changes occur in the humidity of the inlet air. Under working conditions, where it holds a fixed humidity, its length is practically unchanged for all humidities measured. The moisture-sensitive strip 4 is not, therefore, a measuring element, and no calibration is required therefor. It is a control element, pure and simple.

Figure 5:
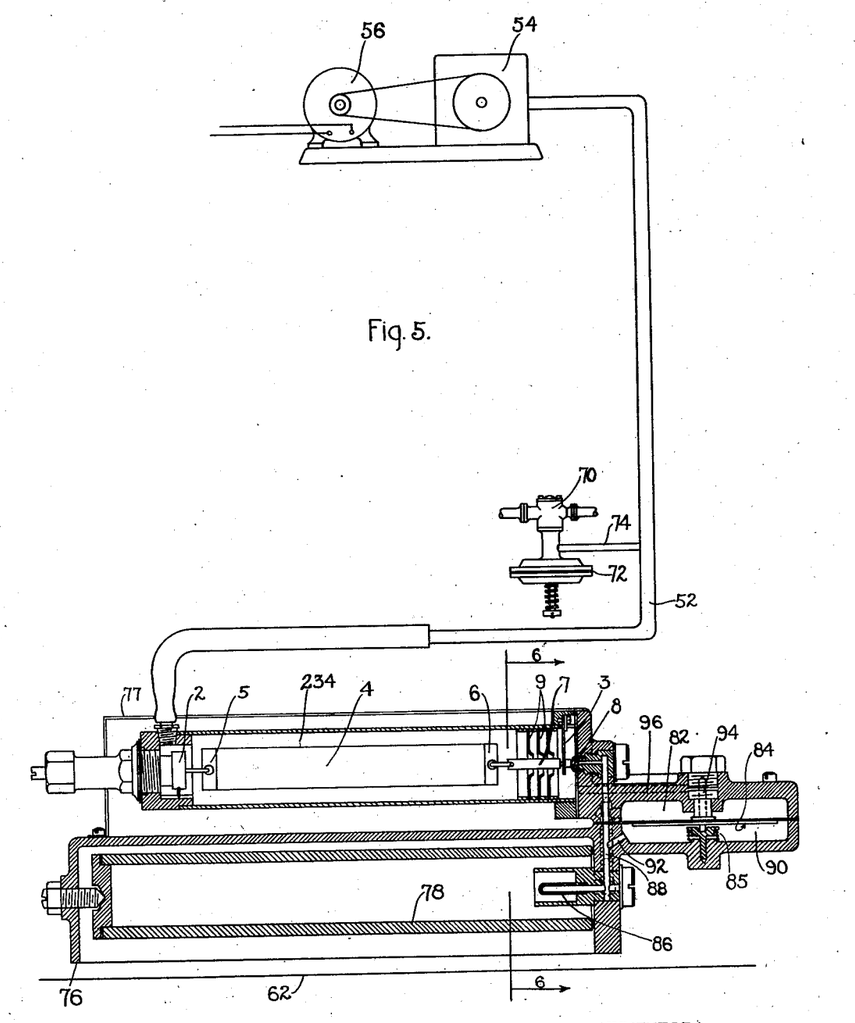
Fig. 5 is a similar view of apparatus embodying a preferred embodiment of the invention, as applied to the control of a paper web through heating the dryer rolls of a paper machine.

The strip 4 must, of course, be made of material, such as gold beater's skin, sufficiently responsive to relative humidity to effect the above-described slight movements of the valve 8 or the lever 11. The chamber 34, 234 or 334, furthermore, should be made of metal or be otherwise free from air leaks, as it is under a vacuum. The metal is of minimum heat mass and maximum surface to reach the temperature of the test gas as rapidly as possible. This is desirable in order to bring about, as nearly as possible, the constant-temperature conditions under which the said principle of physics holds good, in accordance with which the temperature of the chamber 34, 234 or 334 should be maintained at the temperature of the sample gas the relative humidity of which is to be measured. In practice, however, it is possible to maintain the temperature of the chamber 34, 234 or 334 at a fixed differential from the temperature of the sample gas, or in fixed relation thereto, or to correct for the slight errors that might be introduced thereby, if necessary. In most cases, such correction will not be necessary. In paper work, for example, where ambient temperatures change slowly and there is considerable ventilation from a rapidly moving paper web 62, illustrated in Figs. 3, 5 and 7, a rather massive structure may be used for the chamber 34, 234 or 334, depending on the conductivity of the metal parts. In still air, a lighter structure may be desirable. If desired, fan ventilation may be employed on the chamber 34, 234 or 334 to keep it at room temperature, which is the temperature of the test air. Other expedients, too, for bringing the temperature in the chamber 34, 234 or 334 to that of the test gas may be employed, such as the temperature-equalizing baffles 9, shown in Figs. 5 and 9 and the temperature-equalizing fins 10 shown in Fig. 9. The baffles 9 supply heat from the walls of the chamber 34, 234 or 334 to the flowing stream of air or other gas, so that the air surrounding the strip 4, after expanding adiabatically through the control valves, as hereinafter described, is at the same temperature as the test gas to be sampled exterior to the chamber 34, 234 or 334. The radiating fins 10 on the outside of the chamber 334, shown cylindrical, increase its surface and hence facilitate the tendency of the air in the chamber 334 to come rapidly to the temperature of the test gas exterior to the chamber 334. The same result is attained by having a sheet-metal shell 77 surrounding the chamber 234 and enclosing a dead air space in good contact with the comparatively massive casting walls of the filter chamber, as illustrated in Figs. 5 and 6. As the filter-chamber walls are in close proximity to the moving paper web 62, and due to the high rate of ventilation therefrom, they quickly attain the paper temperature.

Among the advantages of employing the hygrometric strip under substantially constant-humidity conditions, is that the effects that would otherwise be introduced by the hysteresis of the strip, produced by humidity changes, are thus eliminated. When going from wet to dry, a different elongation curve is obtained than when going from dry to wet, the difference between these curves being a maximum for wide humidity changes, and sensibly disappearing for very small changes. Instruments employing a hygrometric strip which is subjected to varying humidities are subject to error from this hysteresis effect, particularly if the humidity varies widely and the strip is allowed to expand and contract over wide ranges. Best results are obtained when the humidity changes in the control chamber are so small that the length of the strip varies by a few thousandths of an inch in either direction.

Let it be assumed that the length of the strip 4 is so adjusted, as by the threaded member 2, Fig. 5, that when the air in the chamber 34, 234 or 334 is of 10 percent relative humidity, the valve 8 is just on the point of becoming seated. If, now, the air entering through the valve 8 into the chamber 34 should have a relative humidity greater than 10 percent, the spring 3 would tend to close the valve 8. The exhausting device 54 would then tend to reduce the pressure in the chamber 34, 234 or 334 until the relative humidity in the chamber should again reach the 10 percent relative humidity, or slightly less. This would tend to effect the opening movement of the valve 8 and fresh air would again then be drawn into the chamber 34 through the valve 8.

Figure 3:
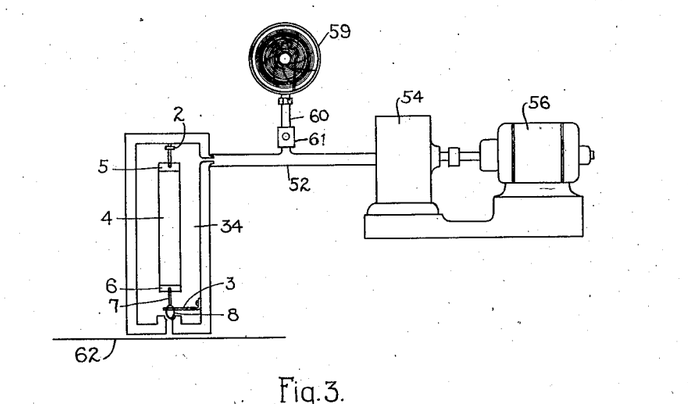

The pressure in the chamber 34, 234 or 334 is thus regulated to yield a constant or fixed relative humidity. The maintenance of a fixed humidity in the chamber 34, 234 or 334, by varying the pressure therein, permits measuring the relative humidity of the test gas drawn into the box 34, 234 or 334 through the valve 8. When used as a measuring device, a vacuum or pressure gauge, which may be either of the indicating type, shown as a U-tube 58 in Fig. 1, or the recording type 59, as illustrated in Figs. 3 and 7, may be connected by a pipe 60 with the pipe 52 and, therefore, with the pump 54. The gauge 58 or 59 measures the pressure maintained in the chamber 34 through its connecting pipe 52. The reading of the gauge 58 or 59 may, of course, be translated, by suitable calibration, into the humidity of the gas under test, of which it is a direct measure.

Figure 1:
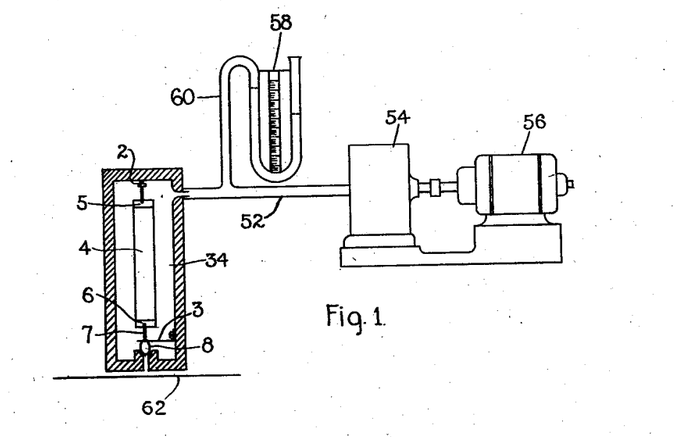
Figs. 1, 2, 3 and 4 are diagrammatic views illustrating novel principles underlying the present invention.
Figure 2:
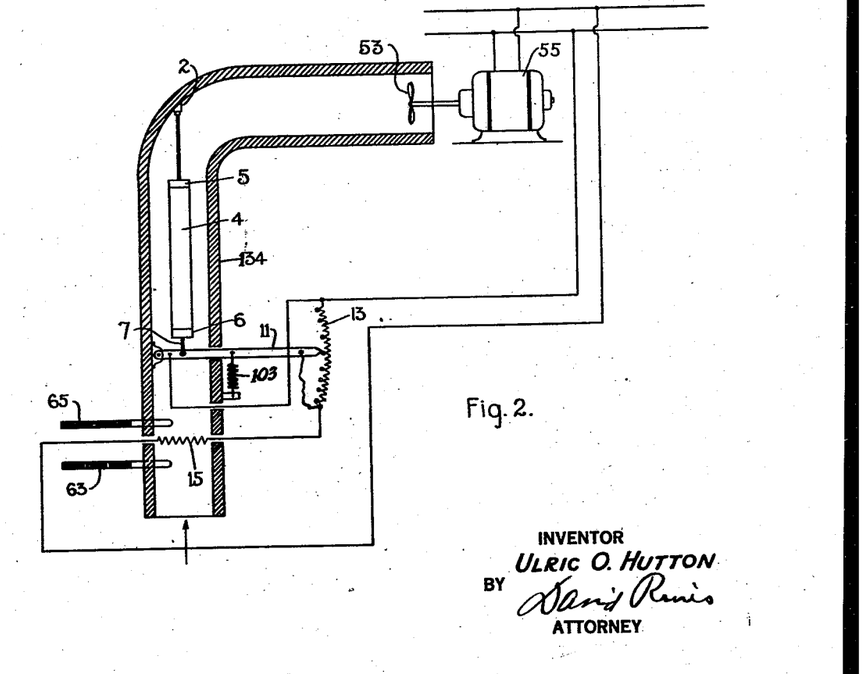

As illustrated diagrammatically in Figs. 1, 3 and 7, the more or less moist, paper web 62, or other material of known, water-content equilibrium, the relative humidity of which it is desired to measure, is fed under the valve 8. The air in the chamber 34 or 234 is continually in a state of equilibrium with the paper web 62, because it is constantly changed by being drawn through the port of the valve 8 by the pump 54. The gage 58 or 59 will read the pressure in the chamber 34 or 234, respectively, and, as previously explained, this pressure bears a known relation to humidity, hence the gage 58 or 59 may be calibrated to read the water content of the paper web 62 directly.

The gauge or recorder, such as shown at 59 may be protected against excessive pressures by a safety valve 61 (Fig. 3), which makes it possible to operate through a limited pressure range; say, from 10 to 15 pounds absolute pressure per square inch. In the absence of the safety valve 61, a gauge of sufficient sensitivity to cover this pressure change over full scale might be damaged by lower pressures, such as five pounds absolute pressure per square inch.

There is another well known principle of physics to the effect that, when a given body of partly saturated gas is heated, its relative humidity is decreased if its pressure is unchanged. If the temperature of such gas is properly regulated, it may be brought to any desired relative humidity less than the initial. In practice, a relative humidity may be selected which is less than any which is expected in the test gas.

The strip 4 of hygrometric material may be suspended in a stream of the partly saturated, test gas flowing through the chamber 134, and arranged so to regulate the temperature of the stream, as by controlling the electric heater 15, a steam valve (not shown in Fig. 2) or the like, that the relative humidity of the air or other gas stream passing the strip 4 in the chamber 134 is held constant. Under such conditions of control, the temperature rise of the stream of test gas is a measure of the relative humidity.

The stream of test gas may be drawn through the chamber 134 by the fan 53, as before described. A thermometer 63 registers the entering gas temperature and a thermometer 65 the gas temperature after passing the heater 15. The difference in temperature registered by the thermometers is a measure of the relative humidity of the gas.

As before stated, and as is obvious, the electric heater system may be replaced by a steam valve, controlling the steam flow to a steam coil or the like; and the two thermometers may be replaced by differential recording thermometers of well known types.

Figure 4:
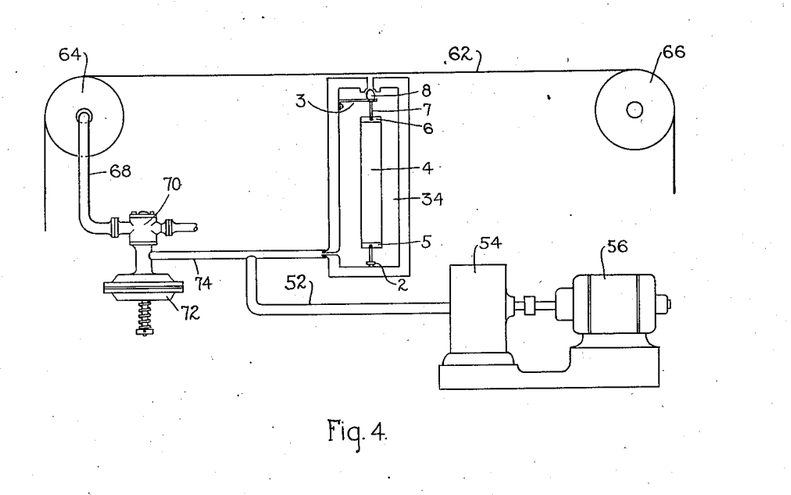

Both by the devices diagrammatically illustrated in Figs. 1, 3 and 4, and by that shown in Fig. 2, the relative humidity of the gas is measured by a regulated, flowing sample of the gas. According to the principle illustrated in Figs. 1, 3 and 4, the regulation is effected by varying the pressure of the gas; and according to the principle illustrated in Fig. 2, the regulation is effected by varying the temperature of the gas. In both cases, the regulation results in a fixed, known, relative humidity of a body of gas, as controlled by the hygrometric strip 4, by changing the physical condition, whether pressure or temperature, of the gas. When either of these two (pressure or temperature) conditions is held constant, the other may be varied to reach the desired result; in which case, the variable condition (pressure or temperature) is proportional to the relative humidity of the gas being tested and gives a direct measure of it.

The pressure or vacuum device, as so far described, comprises, in its essentials, an exhausting device 53 or 54, a vacuum chamber 34 or 234 containing the hygrometric element 4, a valve 8 controlled by the element 4, and a gauge or pressure indicator 58 or 59. The gauge 58 or 59 measures or records variable humidities of the test sample of air which may be continuously introduced into the chamber 34 or 234 from a desired outside point by measuring the changes in the pressure in the chamber 34 or 234 caused by the maintenance of constant humidity in the chamber.

It is a feature of the invention, however, as before stated, not only to measure, but also to control, the relative humidity external to the chamber 34 or 234, so as to maintain the external relative humidity substantially constant. This feature of the invention is illustrated diagrammatically in Fig. 4, and a practical application thereof is illustrated in Figs. 5, 6 and 7. Though the invention is therein illustrated in connection with pressure or vacuum control (Fig. 4), it will be understood that it is equally applicable to temperature control (Fig. 2).

A more or less moist, paper web 62, the humidity of which it is desired to maintain substantially constant, is led over drying rolls 64 of a paper machine, to and past the position where the strip 4 is located, near the output end of the machine, and over calendar rolls 66. The drying rolls are heated by steam-input pipes 68, and the amount of steam admitted is controlled by the motor 70, which may be a steam-regulating valve. The paper web, as it is formed, is fed over the heated dryer rolls 64 to dry it. The amount of steam admitted is such as to assure that the drying of the paper shall proceed at such rate that the paper shall leave the output end of the machine perfectly formed and dried, and having a predetermined, fixed, moisture content of just the right amount, and neither more nor less. The inlet to the chamber 34, as will be understood, is so positioned as to admit air the humidity of which is in equilibrium with the paper surface tested.

The slightly variable humidity of the paper web 62, in close proximity to the valve 8 may be caused to effect a control through the means of the moisture-sensitive element 4 such as to produce a constant, relative humidity in the chamber. A constant pressure is thus maintained in the chamber 34.

If it is inadvisable, as illustrated in the diagram of Fig. 4, to have the strip 4 supply the power necessary directly to control the full stream of test gas into the chamber 34 or 234, the strip 4 may be employed to operate a more sensitive relay of any desired type, as illustrated in Figs. 5, 6 and 7. It is possible to use an electrical relay, operating contact members (not shown) which, in turn, would control the operation of a motor for regulating the control valve 8, but it is preferred to use an air relay, as diagrammatically illustrated in Figs. 5 and 6. The relay will be described in connection with further refinements that are also found desirable to the nice operation of the system.

The air from the web 62, or other air or gas to be tested, is first drawn into the open base of a pick-up nozzle chamber 76, then through a tubular filter 78, of porous material, thence through a pipe or passage 80, and into a chamber 82 at one side of a diaphragm 84. The diaphragm 84 is maintained in its illustrated position by a spring 85.

A small stream of the air or other gas entering the filter 78 trickles, at the same time, through a second filter 86, a pipe 88 and pipe 92, into a chamber 90 on the other side of the diaphragm 84. The pipe 88 communicates also with the valve 8, as shown more particularly in Figs. 5 and 6.

When the valve or relay 8 is just raised from its seat, the pump 54 draws the air or other gas through the filters 78 and 86, the pipe 88, and the valve or relay 8, into the chamber 234. Due to the restriction of flow through the filter 86, the pressure in the pipes 88 and 92 becomes reduced, thus causing the pressure in the chamber 90 to become reduced. The pressure in the chamber 82 thereupon causes the diaphragm 84 to be moved in opposition to the force exerted by the spring 85. A valve 94 becomes thereupon opened, permitting the main air stream to travel through the filter 78, by way of the pipe or passage 80 and the chamber 82, through the valve 94, and through a pipe 96, directly into the chamber 234. The main flow of the moist air is thus caused to enter the chamber 234 through the pipe 96, and not through the relay valve 8. The relay valve 8 thus controls the valve 94.

The moisture content of the web 62 is regulated by controlling the degree of opening and closing of the valve or other motor 70 and, therefore, the amount of steam fed to the drying cylinders, in accordance with the degree of water content of the paper web 62. Fresh samples of moisture-laden air from the surface of the moving paper web 62,—or, for that matter, from any other material or atmosphere or other medium to be tested or controlled,—enter the chamber 234 through the valve 8 and act upon the strip 4, as before described. The open base of the pick-up system 76 is placed sufficiently close to the web 62 so that the air drawn into the chamber 76 is brought to a state of humidity equilibrium with the moisture content of the paper web, as described in connection with Fig. 3. The diaphragm 72 will control the steam valve 70 in accordance with the resulting pressure in the chamber 234:—when the web, as it passes by the strip 4, is too moist, more steam will be supplied to the drying rolls 66, and when the web is too dry, the steam valve 70 will be closed to a corresponding degree.

The moisture content of the paper web 62 is thus controlled in accordance with the pressure of the air in the chamber 234, which pressure, in turn, is controlled in accordance with the moisture content of the paper web 62.

This is effected by causing the moistureladen air in the chamber 76 to communicate with the gas-containing chamber 234; exhausting the gas in the chamber 234 by the pump 54, so as to maintain therein a preselected pressure, the pressure selected being such that the humidity in the sheet 62 is held at a predetermined, desirable point; and controlling the degree of communication between the chambers 76 and 234, by means of the valve 8 and the pipe 96, in accordance with the moisture content in the chamber 76 and the pressure of the gas in the chamber 234.

It will be understood that the above are only illustrations, and that other kinds of control or regulation may be exercised. Thus, as before stated, the device may be used to operate electric motors, valves or other gear in accordance with the moisture content of the medium. In Fig. 10, for example, the invention is shown applied to controlling the humidity of the paper in a paper machine by controlling the speed of the paper machine. The diaphragm 72 actuates a controlling arm of a rheostat 85 for controlling the speed of a motor 67 for driving the dryer rolls 64, the rolls 66 and the rest of the machine as a unit. The speed of the dryer rolls 64 is thus controlled from the moisture content of the paper so as to produce the required, predetermined moisture content in the paper as it leaves the output end of the machine. When the moisture content of the paper falls below a predetermined value, the rolls 64 are speeded up so as to subject the paper to the action of the dryer rolls 64 for a smaller period of time; and when the moisture content rises, the dryer rolls 64 are correspondingly slowed down. The speed of the motor 67 will be controlled in accordance with the degree of moisture content of the paper at the output end of the machine to maintain the moisture content or humidity of the manufactured paper substantially constant. In this case, it is preferred to maintain the temperature of the drying rolls 64 constant.

The above description has proceeded upon the assumption that the relative humidity is measured or controlled by a partial vacuum, the humidity of the test gas being controlled in accordance with variations thereof. It is possible, however, to reverse the process, and to work under pressure, for the principle is equally applicable to pressure or vacuum. For example, if a gas, at atmospheric pressure, and 50% relative humidity be compressed to two atmospheres, without change of temperature, its saturation increases to 100% relative humidity.

The vacuum gauge 58 may be scaled in any desired way. The following will serve as an illustration.

The gases that will ordinarily be used in accordance with the present invention will be originally at barometric pressure. The pressure of the gas, when in the chamber 34, will be reduced by the pump 54 in accordance with varying humidity of the gas. It is desired to measure, with the ordinary vacuum gauge 58, the reduced pressure necessary to maintain a fixed relative humidity.

Letting $P_g$ represent the vacuum-gauge reading, in inches of mercury,
B, the barometric pressure, in inches of mercury,
RH, the relative humidity of the free gas being tested; and
$RH_s$, the relative humidity of the gas in the vacuum chamber 34, then as, by the principle of physics before mentioned, the pressure is inversely proportional to the volume, the pressure of the gas in the vacuum chamber 34 is the barometric pressure minus
$$\frac{RH_s}{RH}$$
times the barometric pressure,
or
$$P_g = B - \frac{RH_s}{RH}B = \frac{RH - RH_s}{RH}B$$

The vaccum gauge 58 may be scaled in accordance with this formula, or with a curve charted therefrom. It will be noted that the scale is independent of the characteristics of the hygrometric material of the strip 4. In testing the device, it is only necessary to adjust the degree of opening of the valve 8 by the member 2, Fig. 5, so that this valve holds the gauge ready to agree with the measured relative humidity of the sample gas being tested. With one point correctly adjusted, all other points on the chart will be correct.

Though it is possible to operate over a full range of humidities, it may be found preferably, in practice, for controlling at a fixed humidity, to operate over a relative-humidity range not exceeding 40%. As small pressure changes may be readily measured by devices obtainable on the market, the present invention lends itself conveniently to accurate measurement or control of small humidity changes.

The above formula for $P_g$ makes it possible to determine the effect of barometric pressure on the accuracy of the reading, when using the ordinary types of vacuum gage. If B varies by one inch of mercury from the usual average of 30 inches, a different value of $P_g$ will be obtained. To correct for this error, a device such as is diagrammatically illustrated in Fig. 8 may be employed.

A recorder is shown connected to the vacuum line by a pipe 100. A flexible capsule 102 (shown in section) operates a pen 104 intermediately pivoted at 106 on the frame 107. The other end of the pen is provided with a slot 116 in which is freely pivoted to slide one end 118 of a link 108, the other end of which is pivoted at 120. The pen records variations of pressure in the pipe 100 on the chart 110. A second evacuated and sealed barometric capsule 112 is provided whose thickness varies with barometric pressure, and which serves to vary the location of a pivot point 114. The sensitivity of the pen motion for a given height change in the capsule 102 is dependent on the distance between the pivot points 106 and 118. The capsule 112 shifts the location of the point 114 and, therefore, of the point 118. It is obvious, therefore, that, by proper selections of the dimensions of the parts, any desired degree of barometric correction or compensation may be obtained. In many cases, however, the error is so small as to be negligible.

Modifications will occur to persons skilled in the art, and all such are considered to fall within the spirit and scope of the invention, as defined in the appended claims.

What is claimed is:

1. Apparatus of the character described comprising means for feeding a moisture-containing web, a gas-containing chamber having a valve controlled inlet positioned at a predetermined point adjacent the path of feed of the web, moisture-responsive means positioned in the chamber at the said point for controlling the valve, and means for exhausting the gas from the chamber in such manner that air is drawn over said web and through said inlet to said chamber.

2. Apparatus of the character described comprising a gas-containing chamber having a valve controlled inlet, means tending to exhaust the gas in the chamber, moisture-responsive means for controlling the valve and responsive to the moisture in the chamber, a pressure gauge connected with the chamber, and a safety valve for the gauge.

3. Apparatus for measuring the relative humidity of a medium comprising means for subjecting the medium to pressure, means for varying the pressure in a manner to adjust the relative humidity of the medium to a known value, and means for measuring the changes in said pressure required to obtain said value.

4. Apparatus for determining the moisture content of a medium comprising means for subjecting a second medium to the moisture of the first-named medium, means for altering the pressure of the second medium to produce a preselected humidity, and means for measuring the said pressure.

5. Apparatus for determining the moisture content of a medium comprising means for subjecting a second medium to the moisture of the first-named medium, means for changing the temperature of the second medium to produce a predetermined humidity, and means for measuring the change in temperature required to produce the predetermined humidity.

6. Apparatus of the character described comprising means for determining the moisture content in a moisture-containing chamber, a gas-containing chamber, means for causing the moisture in the moisture-containing chamber to communicate with the gas-containing chamber, means for partially exhausting the gas from the gas-containing chamber, means governed by the moisture content of the gas-containing chamber for controlling the degree of communication between the chambers, and means for measuring the pressure of the gas in the gas-containing chamber.

7. Apparatus for determining the relative humidity of a flowing stream of gas comprising means for holding the temperature of the stream of gas constant, means for varying the pressure of the stream of gas to give a constant relative humidity, and means for measuring the said pressure.

8. Apparatus for determining the relative humidity of a flowing stream of gas comprising means for holding the pressure of the stream of gas constant, means for varying the temperature of the stream of gas to give a constant relative humidity, and means for measuring the said temperature.

9. Apparatus for determining the relative humidity of a medium subjected to the conditions of temperature and pressure comprising means for varying one of the conditions without adding moisture to or subtracting it from the medium in a manner to adjust the relative humidity of the medium to a known value, and means for measuring the changes in said one condition required to obtain said value.

10. Apparatus for determining the relative humidity of a flowing stream of gas subjected to the conditions of temperature and pressure comprising means for holding one of said conditions constant, means for varying the other of said conditions to give a constant relative humidity, and means for measuring said other condition.

11. Apparatus of the character described comprising a gas-containing chamber having a valve controlled inlet positioned at a predetermined point adjacent to a moisture-containing medium, moisture-responsive means positioned in the chamber at the said point for controlling the valve, and means for exhausting the gas from the chamber.

12. Apparatus for determining the relative humidity of the gas in a gas-containing room comprising a chamber having a valve-controlled inlet, means tending to exhaust the gas in the chamber, and moisture-responsive means subjected to the gas in the chamber for controlling the admission of gas from the room into the chamber through the valve-controlled inlet.

13. Apparatus of the character described comprising a gas-containing chamber, means for exhausting gas from the chamber, a valve for controlling the admission of gas to the chamber, and moisture-responsive means in the chamber for controlling the valve.

14. Apparatus of the character described comprising a gas-containing chamber, means tending to exhaust the gas in the chamber, means for admitting into the chamber moisture from a moisture-containing medium external to the chamber, and a moisture-responsive strip in the chamber for controlling the moisture-admitting means to control the moisture content of the gas in the chamber, thereby to maintain the length of the moisture-responsive strip substantially constant during the controlling action of the strip.

15. Apparatus of the character described comprising a chamber having a valve-controlled inlet, and moisture-responsive means therein for controlling the admission of a gas from outside the chamber into the chamber through the valve-controlled inlet, the chamber being provided with temperature-equalizing baffles.

16. Apparatus of the character described comprising a chamber having a valve-controlled inlet, moisture-responsive means therein for controlling the admission of a gas from outside the chamber into the chamber through the valve-controlled inlet, and a heat-conducting shell enclosing the chamber for equalizing the temperature of the chamber with the temperature of the gas outside the chamber.

17. Apparatus of the character described comprising a gas-containing chamber having a valve-controlled inlet, means tending to exhaust the gas in the chamber, moisture-responsive means for controlling the valve and responsive to the moisture in the chamber, and a pressure gauge connected with the chamber.

18. Apparatus of the chamber described comprising a chamber having a valve-controlled inlet, a moisture-sensitive element within the chamber to actuate the valve, means tending to establish a flow of fluid through said inlet, and means for indicating variations in said fluid pressure in the chamber as an index of humidity influencing said moisture-sensitive element.

19. Apparatus for controlling the relative humidity of a flowing stream of gas in a chamber comprising a hygrometric strip in the chamber in the path of flow of the flowing stream of gas, a means for maintaining the pressure of the chamber substantially constant, and means controlled by the hygrometric strip for controlling the temperature in the chamber to maintain the relative humidity of the flowing stream of gas substantially constant.

20. Apparatus for determining the moisture content of a medium that comprises a gas-containing chamber into which moisture is adapted to enter from the medium, means tending to exhaust the gas in the chamber, and means comprising a moisture-responsive strip in the chamber for controlling the admission of moisture from the medium into the chamber in a manner to adjust the relative humidity of the gas to a known value.

21. Apparatus of the character described comprising a gas-containing chamber having an inlet, means tending to exhaust the gas in the chamber in such manner that air subjected to a moisture-containing medium external to the chamber is drawn through the inlet into said chamber, and means controlled by the moisture of the gas in the chamber for maintaining the humidity of the chamber substantially constant.

22. Apparatus of the character described comprising a chamber having a valve-controlled inlet, moisture-responsive means therein for controlling the admission of a gas from outside the chamber into the chamber through the valve-controlled inlet, and means for equalizing the temperature of the chamber with the temperature of the gas outside the chamber.

23. Apparatus for determining the relative humidity of a gas that is subjected to pressure which comprises means for increasing or decreasing the pressure of the gas in a manner to adjust the relative humidity of the gas to a known value, and means for measuring the change in pressure of the gas required to obtain the said value.

24. Apparatus for determining the relative humidity of a medium subjected to pressure comprising means for maintaining the temperature of the medium substantially constant, means for varying said pressure in a manner to adjust the relative humidity of the medium to a known value, and means for measuring the changes in said pressure required to obtain said value.

25. Apparatus for determining the moisture content of a medium comprising means for subjecting a flowing stream of gas to the moisture of the medium, means for increasing or decreasing the pressure of the gas in a manner to adjust the relative humidity of the gas to a known value, and means for measuring the change in pressure required to obtain said value.

26. Apparatus for determining the moisture content of a medium comprising means for subjecting a flowing stream of gas to the moisture of the medium, means for increasing or decreasing the temperature of the gas in a manner to adjust the relative humidity of the gas to a known value, and means for measuring the change in temperature required to obtain said value.

27. Apparatus for determining the relative humidity of the gas in a gas-containing room comprising a chamber the gas in which is subjected to the conditions of temperature and pressure, the chamber having a valve-controlled inlet, moisture-responsive means subjected to the gas in the chamber for controlling the admission of gas from the room into the chamber through the valve-controlled inlet, means for maintaining one of the conditions in the chamber constant, means for controlling the other condition in the chamber, and means for measuring the pressure of the gas within the chamber.

28. Apparatus for determining the relative humidity of the gas in a gas-containing room comprising a chamber having a valve-controlled inlet, moisture-responsive means subjected to the gas in the chamber for controlling the admission of gas from the room into the chamber through the valve-controlled inlet, means tending to exhaust the gas in the chamber, and means for measuring the pressure of the gas within the chamber.

29. Apparatus for determining the moisture content in a chamber comprising a gas-containing chamber having a valve-controlled inlet, means for causing the moisture in the first-named chamber to communicate with the gas-containing chamber, means tending to exhaust the gas from the gas-containing chamber, means governed by the moisture content in the gas-containing chamber for controlling the valve-controlled inlet, and means for measuring the pressure of the gas in the gas-containing chamber.

ULRIC O. HUTTON.